United States Patent [19]
Baldwin et al.

[11] 3,761,527
[45] Sept. 25, 1973

[54] PROCESS FOR OXIDATION OF 4-NITROSO-M-CRESOL

[75] Inventors: Roger A. Baldwin, Oklahoma City, Okla.; Ming T. Cheng, Buena Park, Calif.

[73] Assignee: Kerr-McGee Corporation, Oklahoma City, Okla.

[22] Filed: June 3, 1970

[21] Appl. No.: 43,225

[52] U.S. Cl............ 260/622 R, 260/621 N, 260/645
[51] Int. Cl............................................. C07c 79/24
[58] Field of Search............ 260/622 R, 645, 621 N

[56] References Cited
UNITED STATES PATENTS

| | | | |
|---|---|---|---|
| 3,510,527 | 5/1970 | Prosser | 260/622 R |
| 2,301,912 | 11/1942 | Jones et al. | 260/622 R |
| 3,510,527 | 5/1970 | Prosser | 260/622 R |
| 3,519,693 | 7/1970 | Harvey et al. | 260/622 R |

FOREIGN PATENTS OR APPLICATIONS

| 8,256 | 3/1968 | Japan | 260/622 R |
|---|---|---|---|

OTHER PUBLICATIONS

Wallace "Hydrogen Peroxide in Organic Chemistry" pp. 25,26 and 52 QD 281 09 W 34
"Ber." Vol. 71, Kuhn et al. pp. 779–780
"Webster's" New Internat. Dictionary Sec. Ed. (1940) p. 1221
Groggins "Unit Processes in Organic Synthesis" (1958) pp. 493–494 & 497–499

Primary Examiner—Bernard Helfin
Assistant Examiner—W. B. Lone
Attorney—William G. Addison

[57] ABSTRACT

The invention provides an oxidation process for converting 4-nitroso-m-cresol to the corresponding 4-nitro-m-cresol by reacting the nitroso compound with an oxidizing agent in the presence of a catalyst at reflux temperatures in a reaction solvent solution including lower aliphatic and alicyclic ketones. The mixture thereafter is cooled and the 4-nitro-m-cresol is recovered from the solvent solution.

6 Claims, No Drawings

3,761,527

PROCESS FOR OXIDATION OF 4-NITROSO-M-CRESOL

BACKGROUND OF THE INVENTION

Nitrophenolic compounds are useful as indicators as well as intermediates for many valuable materials and are particularly suitable for use in the preparation of insecticide compounds such as O,O-diethyl-O-(4-nitrophenyl) phosphorthioate (commonly known as ethyl parathion) and O,O-dimethyl-O-(3-methyl-4-nitrophenyl) phosphorthioate. Heretofore, it has been suggested to prepare such nitrophenolic compounds via the nitration of phenolic materials with sulfuric-nitric acid mixtures. Such nitrations are known to give a variety of isomers, usually in low yield, accompanied by considerable quantities of tars and colored materials. Such by-products result from the oxidation of the phenolic starting materials.

It has also been suggested to prepare nitrophenolic compounds by the caustic hydrolysis of chloronitroaromatic derivatives. The use of such caustic hydrolysis suffers from the disadvantage, however, that it is difficult to obtain the desired isomer required for the hydrolysis without the formation of unwanted isomers which must be removed from the mixture. Thus, nitration of chlorobenzene, a well known procedure, yields about a 65/35 mixture of the para- and ortho-isomers of chloronitrobenzene. Subsequent caustic hydrolysis of this mixture yields the corresponding ortho- and para-nitrophenols. However, since ortho-nitrophenol is inactive in insecticides such as methyl and ethyl parathion, it must be removed from the mixture before the para-nitrophenol can be used in insecticide manufacture.

It has also been suggested that nitrophenolic compounds can be prepared by oxidizing the corresponding nitroso compound. In fact, in Hollingsworth, R. M., "Biochemical Factors Determining Selective Toxicity of the Insecticide Sumithion and Its Analogs," PhD. Thesis, University of California, Riverside, 1966, p. 55, it is suggested to effect the oxidation of 4-nitroso-m-cresol compounds utilizing dilute nitric acid, i.e., one volume of concentrated nitric acid for three volumes of water. That process is described as being carried out at 40°C. for 1 ½ hours; however, it produces a product in a yield of only about 31.5 percent.

Another process which has been suggested utilizes 30 percent hydrogen peroxide as an oxidizing agent, the reaction being carried out in glacial acetic acid and with catalytic amounts of ammonium molybdate. It has been found that when using 4-nitroso-m-cresol, the resultant reaction mixture must be heated briefly to initiate the reaction. After workup, which includes dilution with water followed by extraction with ether, yields of only about 60 percent of the 4-nitro-m-cresol are obtained.

Thus, while these prior art processes provide satisfactory products, they are not completely satisfactory commercially because of the relatively low yields obtained.

SUMMARY OF THE INVENTION

The surprising discovery now has been made that 4-nitroso-m-cresol may be oxidized to the corresponding nitrophenolic compound in exceptionally high yields by effecting the oxidation at reflux temperatures utilizing hydrogen peroxide as the oxidizing agent, ammonium molybdate as a catalyst and lower aliphatic or alicyclic ketones as the reaction solvent. The reason that higher yields are obtained using these solvents in place of glacial acetic acid is not fully understood at the present time. However, when such solvents are used, yields in excess of 90 percent consistently have been obtained.

It has been found that the amount of hydrogen peroxide used may vary within relatively wide limits. However, amounts at least 5 percent in excess of the stoichiometric amount, based on the initial quantity of nitroso compound, must be used. Amounts up even as high as 60 percent may be used although no advantages are obtained using such large excesses. A preferred range is an excess of about 5-20 percent. Particularly satisfactory results have been obtained using 30 percent hydrogen peroxide of commerce.

An example of a catalyst which has been found to be suitable in the process of this invention is ammonium molybdate, $(NH_4)_6MO_7O_{24} \cdot 4H_2O$. Other suitable catalysts include sodium tungstate and sodium molybdate. Ferrous salts do not catalyze this oxidation reaction.

Solvents which are suitable for use in the preferred reaction comprise lower aliphatic or alicyclic ketones in which the nitrophenolic product is soluble. Particularly satisfactory results have been obtained using acetone and methyl ethyl ketone, diethyl ketone, methyl isobutyl ketone, diisobutyl ketone, methly isopropyl ketone, cyclohexanone, methly cyclohexanones, cyclopentanone, methly cyclopentanones and the like.

As indicated hereinabove, the reaction is carried out at the reflux temperature of the reaction mixture. The time of the reaction appears to be critical. Thus, it has been found that the mixture must be maintained at the reflux temperature for at least 2 hours to obtain the desired nitrophenolic compounds in high yields. If, for example, the reaction is carried out for less than 1 hour, the reaction does not go to completion. The exceptionally high yields obtainable by practice of this invention are obtainable only when the reaction is carried out for 2 hours or longer.

Generally, only relatively small quantities of catalyst need be employed, that is, about 1 to 3 grams of catalyst per mole of nitroso compound. Greater amounts of catalyst may be used if desired; however, this only increases the cost of performing the reaction without increasing the yield or purity of product obtained.

DESCRIPTION OF PREFERRED EMBODIMENTS

To illustrate the invention even more fully, the following specific examples are set forth. It will be understood, of course, that these examples are only illustrative and do not limit the scope of the invention which is defined in the appended claims.

EXAMPLE 1

A solution consisting of 55.5 grams (0.405 moles) of 4-nitroso-m-cresol and 2.5 grams (0.002 moles) of ammonium molybdate catalyst dissolved in 500 ml of acetone is heated to reflux and there then is added to the solution over a period of about 1 hour, 66 ml (0.64 moles) of 30 percent hydrogen peroxide. The resulting mixture is continuously maintained at the reflux temperature for a period of about 5 hours, after which the mixture is cooled and the acetone solvent recovered at reduced pressure. The red-orange solids remaining are washed thoroughly with water until the washes no longer test for peroxide. The resulting tan powder is dried and weighs 59.7 grams with a melting point of 125°–128°C. The yield is 93 percent.

EXAMPLE 2

To a gently refluxing solution of 6.8 g (0.049 moles) of 4-nitroso-m-cresol and 0.1 g ($8.0 \times 10^{-5}$ moles) of ammonium molybdate catalyst in 60 ml methly ethyl ketone solvent is slowly added a solution of 4 ml (0.078 moles) of 30 percent hydrogen peroxide. After five hours at the reflux temperature, the solvent is carefully removed at reduced pressure. The resulting solid product is washed with dilute sodium sulfite solution until all excess peroxide is destroyed. After further washing, the 4-nitro-m-cresol product obtained weighs 6.6 g and the yield is 91.4 percent.

EXAMPLE 3

A solution of 13.7 g (0.1 mole) of 4-nitroso-m-cresol and 1 ml of 10 percent ferrous sulfate solution in 60 ml of acetone is warmed to the reflux temperature. To this solution is added 15 ml of 30 percent hydrogen peroxide (0.12 mole) after which the mixture is heated at reflux for 4 hours. The solvent is removed, the residue washed carefully to remove peroxide values, and air dried. The residue is largely unoxidized 4-nitroso-m-cresol, demonstrating that ferrous sulfate is not a satisfactory catalyst in the process of this invention.

EXAMPLE 4

An experiment similar to that described in Example 1 is carried out except that 50 ml aliquots are removed from the mixture after 1 hour, 2 hours, and 6 hours. Each sample is worked up as described above and the melting point range and infrared spectrum (potassium bromide pellets) of each sample is obtained and is compared with known reference mixtures. Pertinent data presented in Table I show that the reaction is substantially complete after 2 hours.

TABLE I

Rate of Oxidation of 4-Nitroso-m-Cresol

| Sample | Melting Point Range, °C | Melting Point Range of Known Mixtures, °C |
| --- | --- | --- |
| 1 hr. | Melts 122–125, softens 118 | 95%-Nitro/5%-Nitroso Softens 121, melts 122.5–126.5 |
| 2 hrs. | Melts 125–127.5, softens 123 | 98%-Nitro/2%-Nitroso Softens 125.5, melts 126–127 |
| 6 hrs. | Melts 126–127.5, softens 123 | |

Similarly, examination of the infrared spectra of the above samples at about 1,035 cm$^{-1}$ and at 1,020 cm$^{-1}$ reveals the oxidation is about 98 percent complete after 2 hours and is even more complete after 6 hours.

Additional examples of this invention are given in Table II.

TABLE II

| Example No. | Moles 4-nitroso-m-cresol | Moles Ammonium molybdate | 30% H$_2$O$_2$ | Acetone, ml. | Reaction temp., °C. | Reaction time, hr. | Product yield, percent | Product M.P., °C |
| --- | --- | --- | --- | --- | --- | --- | --- | --- |
| 5 | 0.084 | 0.0004 | 0.137 | (¹) | Steam bath | ³ 20 | 53.5 | 125–127 |
| 6 | 0.049 | 0.00024 | 0.078 | (²) | do | ³ 30 | 61.3 | 146–150 |
| 7 | 0.049 | 0.00 | 0.078 | 60.0 | Reflux | 1.5 | | 165–167 |
| 8 | 0.049 | 0.00024 | 0.078 | 60.0 | do | 7.0 | 83.5 | 122–124 |
| 9 | 0.049 | 0.00024 | 0.078 | 60.0 | do | 5.0 | 90.0 | 125–127 |
| 10 | 0.049 | 0.00008 | 0.039 | 60 | do | 6.6 | 87.5 | 100–110 |
| 11 | 0.405 | 0.0020 | 0.645 | 500 | do | 6.0 | 93.0 | 125–128 |
| 12 | 0.100 | 0.00016 | 0.120 | 60 | do | 3.0 | 89.0 | 125–128 |
| 13 | 0.100 | 0.00016 | 0.110 | 60 | do | 3.0 | 91.0 | 125–127.5 |
| 14 | 0.100 | 0.00008 | 0.120 | 60 | do | 3.0 | 89.0 | 123–125 |
| 15 | 0.100 | 0.00016 | 0.105 | 60 | do | 3.0 | 92.3 | 124–127 |
| 16 | 0.100 | 0.00012 | 0.110 | 60 | do | 3.0 | 90.0 | 123–125 |
| 17 | 0.100 | 0.00016 | 0.105 | 60 | do | 3.0 | 92.8 | 125–127 |
| 18 | 1.000 | 0.00323 | 1.55 | 600 | do | 3.0 | 91.8 | 120–127 |
| 19 | 0.755 | 0.00061 | 0.875 | 455 | do | 3.0 | 91.5 | 110–120 |
| 20 | 0.200 | 0.00032 | 0.2 | 120 | do | 3.0 | 93 | 112–124 |
| 21 | 0.1 | (⁴) | 0.12 | 60 | do | 4.0 | | |
| 22 | 1.123 | 0.0008 | 1.41 | 600 | do | 5.0 | | 85–98 |
| 23 | 1.0 | 0.0032 | 1.55 | 600 | do | 3.5 | 91.2 | 120–127 |
| 24 | 1.5 | 0.0019 | 1.64 | 900 | do | 9.0 | 92.0 | 119–122 |

¹ 100 ml. gl. acetic acid.
² 60 ml. gl. acetic acid.
³ Minutes.
⁴ 1 ml. of 10% FeCl$_2$ solution.

The results set forth in Table II show that: in Example 5, the use of glacial acetic acid results in a low product yield; in Example 6, that the product is of indeterminate character and appeared to be largely unreacted starting material as shown by the relatively high and broad melting point range; in Example 7, that the absence of catalyst results in a quantitative recovery of staring material as shown by the high but narrow melting point range; in Example 10, use of less than a stoichiometric amount of oxidant results in product containing unoxidized nitroso compound; in Example 21 that FeCl$_2$ also is not a satisfactory catalyst; in Examples 22 and 24, that an insufficient amount of catalyst was employed.

What is claimed is:

1. A process for oxidizing 4-nitroso-m-cresol to form 4-nitro-m-cresol which comprises: heating a mixture of 4-nitroso-m-cresol and hydrogen peroxide in a reaction solvent in the presence of a catalyst to the reflux temperature of the mixture; maintaining said temperature for a time of at least 2 hours to effect oxidation of the 4-nitroso-m-cresol to 4-nitro-m-cresol and recovering the 4-nitro-m-cresol from the mixture; said solvent being selected from the group consisting of lower aliphatic and alicyclic ketones in which the 4-nitro-m-cresol is soluble; said catalyst being selected from the group consisting of ammonium molybdate, sodium molybdate and sodium tungstate and said hydrogen peroxide being present in an amount of at least 5% in excess of the stoichiometric amount required to oxidize the 4-nitroso-m-cresol.

2. A process as set forth in claim 1 wherein the 4-nitroso-m-cresol and catalyst are mixed in said solvent, heated to reflux temperature and maintained at said temperature while the hydrogen peroxide is introduced.

3. A process as set forth in claim 1 wherein the catalyst is ammonium molybdate.

4. A process for oxidizing 4-nitroso-m-cresol to form 4-nitro-m-cresol which comprises: heating a mixture of 4-nitroso-m-cresol and hydrogen peroxide in a reaction solvent in the presence of a catalyst to the reflux temperature of the mixture; maintaining said temperature for a time of at least 2 hours to effect oxidation of the 4-nitroso-m-cresol to 4-nitro-m-cresol and recovering the 4-nitro-m-cresol from the mixture; said catalyst being selected from the group consisting of ammonium molybdate, sodium molybdate and sodium tungstate; said hydrogen peroxide being present in an amount of at least 5% in excess of the stoichiometric amount required to oxidize the 4-nitroso-m-cresol and said solvent being selected from the group consisting of acetone, methyl ethyl ketone, diethyl ketone, methyl isobutyl ketone, di-isobutyl ketone, methyl isopropyl ketone, cyclohexanone, methyl cyclohexanone, cyclopentanone and methyl cyclopentanone.

5. The process of claim 4 wherein the solvent is selected from the group consisting of acetone and methyl ethyl ketone.

6. A process as set forth in claim 4 wherein the 4-nitroso-m-cresol and catalyst are mixed in said solvent, heated to reflux temperature and maintained at said temperature while the hydrogen peroxide is introduced.

* * * * *

UNITED STATES PATENT OFFICE
CERTIFICATE OF CORRECTION

Patent No. 3,761,527   Dated September 25, 1973

Inventor(s) Roger A. Baldwin and Ming T. Cheng

It is certified that error appears in the above-identified patent and that said Letters Patent are hereby corrected as shown below:

In the heading, Assignee should read -- Kerr-McGee Chemical Corp. --

Signed and sealed this 19th day of November 1974.

(SEAL)
Attest:

McCOY M. GIBSON JR.
Attesting Officer

C. MARSHALL DANN
Commissioner of Patents